(12) United States Patent
Czaja et al.

(10) Patent No.: US 7,203,527 B2
(45) Date of Patent: Apr. 10, 2007

(54) METHOD AND APPARATUS FOR REDUCING POWER OF A CDMA MOBILE STATION BY CONTROLLED TRANSITION FROM CONTROL HOLD TO ACTIVE STATE

(75) Inventors: Stanislaw Czaja, Cardiff, CA (US); Hong Kui Yang, San Diego, CA (US); Anthony Lee, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 545 days.

(21) Appl. No.: 10/431,646

(22) Filed: May 6, 2003

(65) Prior Publication Data

US 2003/0227882 A1   Dec. 11, 2003

Related U.S. Application Data

(60) Provisional application No. 60/278,919, filed on May 6, 2002.

(51) Int. Cl.
*H04B 1/38* (2006.01)

(52) U.S. Cl. .................. 455/574; 455/572; 370/311

(58) Field of Classification Search ............ 455/522, 455/574, 69, 572; 370/310, 318, 311
See application file for complete search history.

(56) References Cited

U.S. PATENT DOCUMENTS

| | | | |
|---|---|---|---|
| 6,456,604 B1 | 9/2002 | Lee et al. | 370/328 |
| 6,463,307 B1 | 10/2002 | Larsson et al. | 455/574 |
| 6,597,683 B1 | 7/2003 | Gehring et al. | 370/348 |
| 6,624,767 B1 * | 9/2003 | Shiu et al. | 341/81 |
| 6,680,967 B1 * | 1/2004 | Westman | 375/148 |
| 6,717,924 B2 * | 4/2004 | Ho et al. | 370/311 |
| 2003/0054807 A1 * | 3/2003 | Hsu et al. | 455/414 |

OTHER PUBLICATIONS

"Medium Access Control (MAC) Standard for cdma2000 Spread Spectrum Systems, Release C", 3GPP2 C.S003-C, Version 1.0, May 28, 2003, pp. 2-103-2-110 and 2-121-2-122.

\* cited by examiner

*Primary Examiner*—Edward F. Urban
*Assistant Examiner*—Raymond S. Dean
(74) *Attorney, Agent, or Firm*—Jaquez & Associates; Martin J. Jaquez, Esq.; William C. Boling, Esq.

(57) ABSTRACT

A method and apparatus for reducing power dissipation in mobile stations that are configured to provide concurrent voice and high-speed packet data communication capability in a cellular telecommunications system. A state is defined during which data directed to a mobile station (MS) is not fully receive processed by the MS. Such a reduced receive processing state may be co-extensive with a Control Hold state. A notification mechanism is presented by which a serving base station directs a mobile station to return from reduced to full receive processing in advance of transmitting data on a packet data channel. The notification may take several forms, such as a message presenting the MS MAC address and one or more other bits of predetermined data content. Return to active (full receive) status may be required to be completed within a predetermined time, such as one ACK delay, after notification.

30 Claims, 5 Drawing Sheets

METHOD AND APPARATUS FOR REDUCING POWER OF A CDMA MOBILE STATION BY CONTROLLED TRANSITION FROM CONTROL HOLD TO ACTIVE STATE

This application claims priority under 35 USC 119 to U.S. Provisional Application No. 60/378,919 filed May 6, 2002 and entitled "Transition from Control Hold to Active State for CDMA System," the contents of which are hereby incorporated in their entirety by reference.

BACKGROUND OF THE INVENTION

1. Field of the Invention

This invention generally relates to wireless communications, and more specifically to CDMA telecommunications systems.

2. Related Art

In CDMA telecommunications, the state of the art is substantially reflected in documents published by standardization bodies. The published standard that preceded the subject matter presented herein is IS-2000 Release B ("IS-2000 B"), which is hereby incorporated in its entirety by reference. According to that standard, CDMA cellular telecommunications devices may be enabled for high-speed packet data together with voice communication. An exemplary system and protocol for such services is an early step in the evolution of data-voice capabilities that may be referred to as 1×EV-DV, 1×EV-DV-enabled or simply "EV-DV," If so, devices so enabled shall include a number of different physical channels. The method and apparatus presented herein includes improvements upon the system described in IS-2000 B, but those skilled in the wireless communications art shall recognize that the improvements are applicable to other systems as well.

As is well known, cellular communications systems generally employ portable transceivers, each of which is called a mobile station ("MS"), for user communications. Such systems are one-to-many in nature, and generally include a relatively modest number of base stations ("BSs") that each communicate with many MSs. The BSs are disposed throughout geographical areas, as they are needed, to satisfy user demands for range and connection volume. For EV-DV services, the BS infrastructure must also satisfy user requirements for data volume.

Portable cellular transceivers are complex devices having a great deal of receive signal processing capability, as well as significant transmission capability. As any user will attest, longer battery life is always desirable for such mobile units. Accordingly, it is very desirable to avoid unnecessary power dissipation in transceiver MSs.

The extra channels added to help provide sufficient data communication capability for EV-DV-enabled MSs tend to increase power consumption. However, it is desirable to make EV-DV-enabled MSs nearly as small as less-capable cellular MSs, which means that batteries need to remain small as well. These constraints create a particular challenge to find ways to avoid power dissipation by processes that are non-essential, or that can be rendered non-essential through creative system conventions.

When seeking to reduce power consumption, attention is often focused upon transmission activities by MS transceivers because transmitting is generally performed at high powers compared to receiving. Nonetheless, despite continuing efforts heretofore, power consumption in EV-DV-enabled MSs remains undesirably high. Accordingly, a need exists to locate all processing that consumes significant power in EV-DV-enabled MSs, and to determine a way to render such processing unnecessary so that the power consumption due to such processing can be reduced or eliminated.

SUMMARY

A method and apparatus is described herein for reducing power dissipation in mobile stations that are configured to provide combined voice and data capability within a cellular telecommunications system. The mobile stations have a plurality of different physical channels. A reduced receive processing state is entered during which receive processing is reduced for at least one data channel, and the state is exited upon receiving a transmission on a signaling channel that contains an indication to exit.

One aspect of the method and apparatus includes a method of reducing power consumption by a mobile station during an active CDMA data-voice connection. The method includes establishing a CDMA data-voice connection between a mobile station ("MS") and a base station ("BS") employing initial levels of receive processing on a plurality of physical channels, and also includes identifying a suspended transfer state during which the MS will not receive data on at least a particular one of the plurality of physical channels for a duration that is not predetermined. The method further includes reducing the receive processing of a signal on the particular channel.

Another aspect includes a method of transitioning from a control hold state to an active state in a cellular communications system MS. The method includes suspending attention to content of a first channel during a control hold state, and processing a transition signal packet received by the MS during the control hold state on a different second channel. The method further includes determining that the transition signal packet contains information directing termination of the control hold state, and transitioning to an active state, including resuming attention to content of the first channel by the MS, at the end of a predetermined time period subsequent to receipt of an entirety of the transition signal packet.

A further aspect includes a method of reducing power consumption by a mobile station during an active CDMA data-voice connection, and includes establishing a CDMA data-voice connection between a MS and a BS employing active levels of receive processing on a plurality of physical channels. The method further includes a step for entering a limited data communication state, a step for reducing received signal processing during the limited communication state, and a step for identifying a received instruction to restore received signal processing to the active levels by returning from the limited communication state.

Yet another aspect of the method and apparatus includes mobile apparatus for receiving cellular telecommunication signals. The apparatus includes a receiver unit configured to concurrently receive a plurality of physical communication channels, including a packet signaling channel and a packet data channel, the receiver unit having processing facilities for the packet data channel, including raw signal processing blocks configured to derive and store symbols conveyed on the packet data channel, and symbol processing blocks configured to demodulate and decode the stored symbols. The apparatus also includes a control unit configured to temporarily place the mobile apparatus into a reduced receive processing state upon appropriate entry conditions, and to cause the mobile apparatus to exit the reduced receive processing state upon receiving a transmission directing such exit. Additionally, the processing facilities for the packet data channel are configured to suspend some receive processing of the packet data channel while the mobile apparatus is in the reduced receive processing state.

BRIEF DESCRIPTION OF THE DRAWINGS

Embodiments of the present invention will be more readily understood by reference to the following figures, in which like reference numbers and designations indicate like elements.

DETAILED DESCRIPTION

Overview

CDMA cellular telephone communications systems have been primarily implemented for voice communications. There has been a desire to add reasonably high-speed data communication capability to such systems. In order to achieve effective data transmission together with voice transmission (referred to herein as "EV-DV"), a number of CDMA system features are being added or modified. For example, in order to increase overall data rate, several additional physical channels are provided in EV-DV-capable CDMA mobile station ("MS") transceivers to support packet data communication. Additionally, in order to enhance flexibility for delivering data to a multiplicity of users, the basic 20 ms frame structure of previous versions of CDMA protocol is made controllable and addressable in "slots" having a duration of 1.25 ms.

Figure 1:
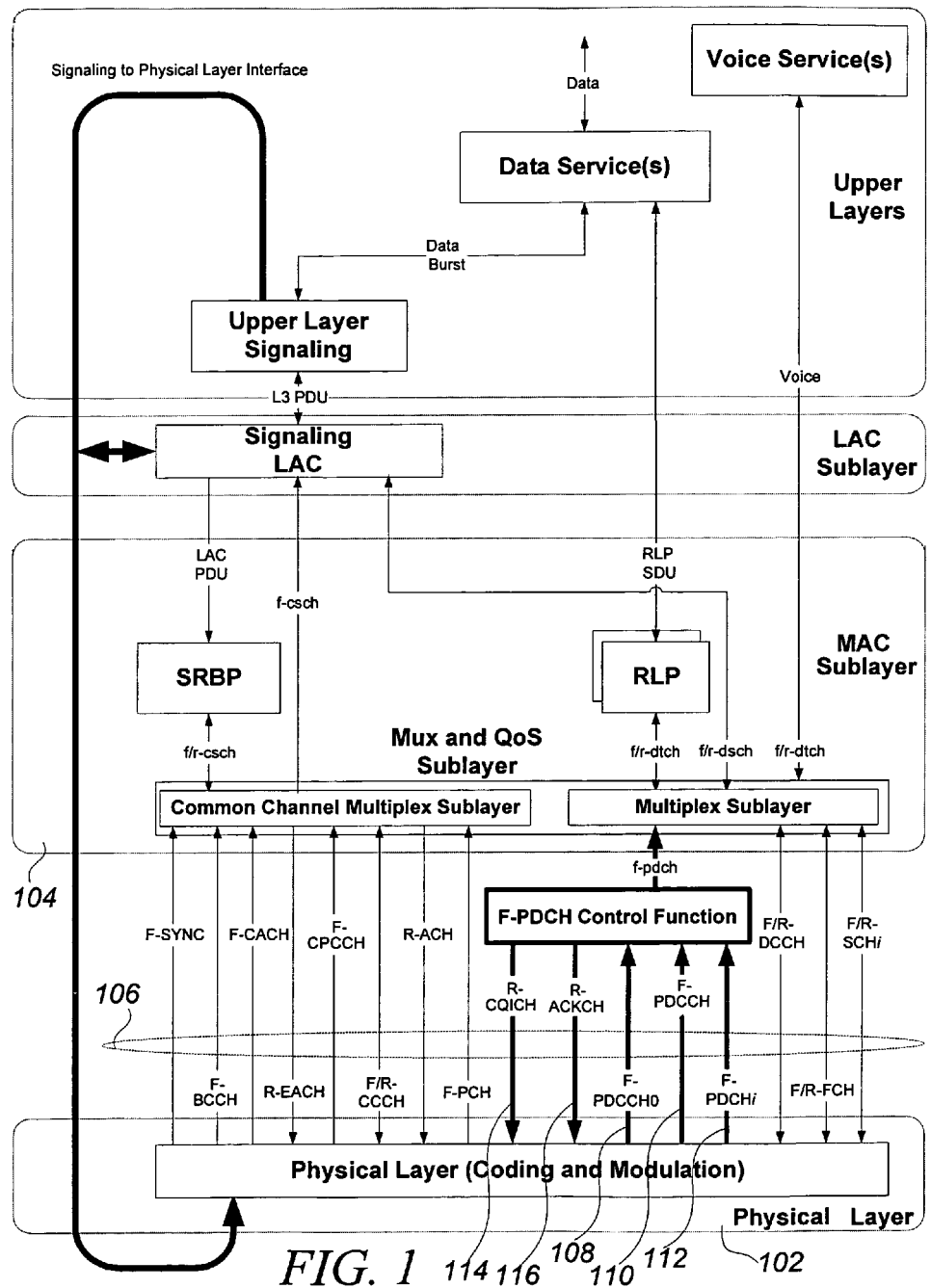
FIG. 1 is a block diagram of layer architecture for a data-voice (EV-DV) communication mobile station having multiple physical channels for packet data communications.

The physical channels added to support packet data capabilities include both forward and reverse channels. FIG. 1 illustrates an exemplary interface between a physical layer 102, and a medium access control ("MAC") layer 104, used by a CDMA EV-DV mobile station ("MS"). Each one of a set of physical channels 106 is indicated by an arrow with a channel label. The direction of the arrow indicates the direction of information flow for the particular channel: forward ("F") channels communicate information to the MS (into the MAC layer), while reverse ("R") channels communicate information from the MAC layer of the MS to a base station ("BS"). Some channels are bi-directional, indicated by double-ended arrows and "F/R" prefixed to the channel label.

Physical channels identified as components of a Forward Packet Data Control Function ("F-PDCF") include two forward packet data control channels ("F-PDCCHs"), F-PDCCH0 108 and F-PDCCH1 110. The F-PDCCHs convey information from the BS to indicate, for example, whether a particular packet "belongs" to a target MS, and how the MS may decode data that it receives. The primary payload data channel is a forward packet data channel (F-PDCH) F-PDCHi 112. The F-PDCHi 112 assigned to the MS may be selected from among a plurality of packet data channels that are available from the serving base station. A MAC sublayer 104 of the MS is shown in a configuration in which it will receive packet data via the F-PDCHi 112. A Reverse Channel Quality Indication Channel ("RCQICH") R-CQICH 114 provides feedback information from the MS to the serving BS indicative of signal quality. A Reverse Acknowledge Channel ("R-ACKCH"), R-ACKCH 116, is used by the MS to acknowledge correct receipt (ACK), or to indicate failure to receive a particular packet (NAK).

These different physical channels may have very different bit rate capacities. In particular, the packet data control channels F-PDCCH0 108 and F-PDCCH1 110 may convey only a few thousand bits per second ("bps"), while F-PDCH packet data channels may convey roughly 3 Mbps. The amount of signal processing effort required for each channel also varies. In general, the processing effort required to receive, demodulate, decode and store the data in each of the channels is more or less commensurate with bit capacity. However, levels of encoding and error correction, for example, also vary between channels and will affect the processing effort required.

Receive Processing

Figure 2:
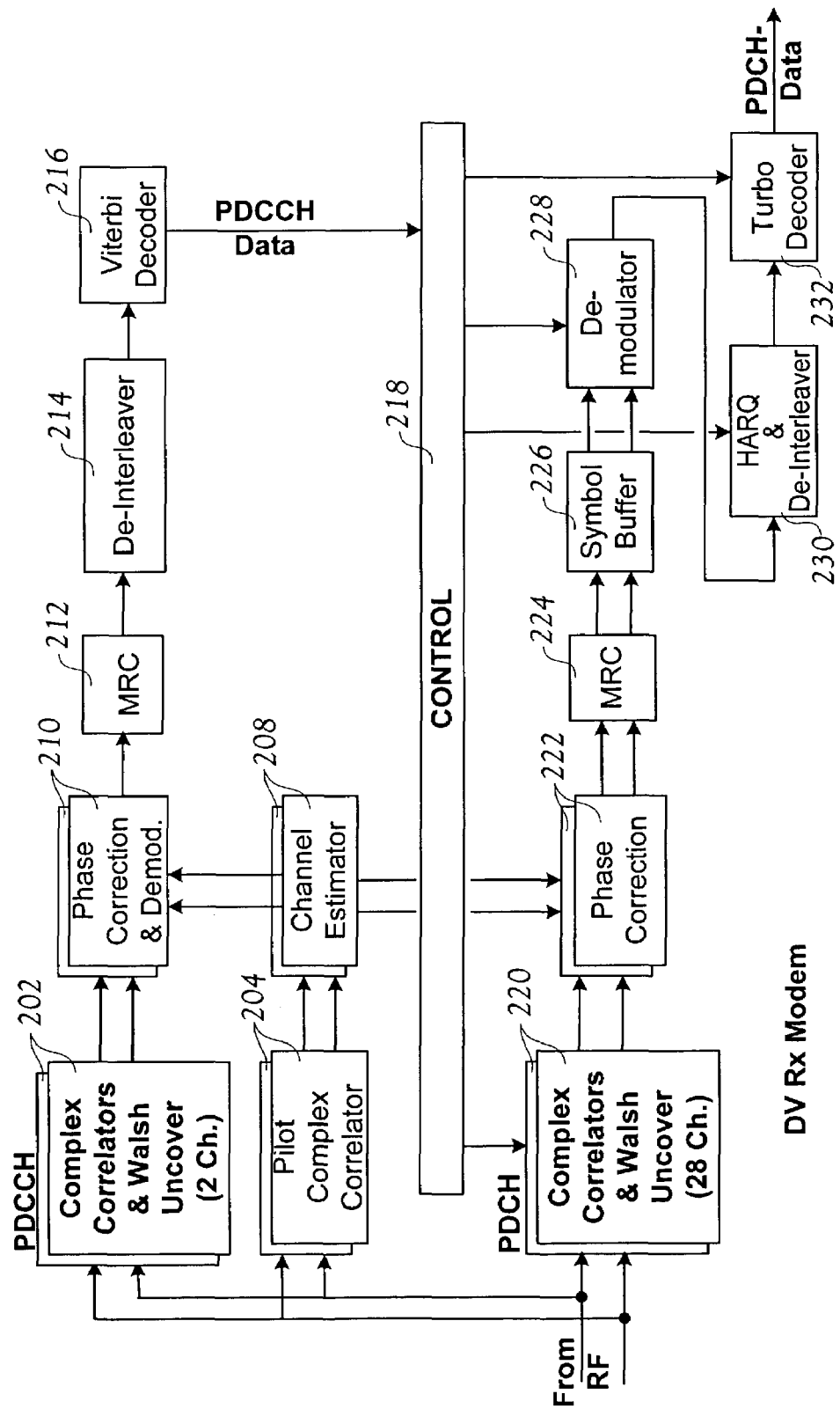
FIG. 2 is a block diagram of receiver signal processing hardware for an exemplary EV-DV mobile station.

FIG. 2 is a simplified block diagram illustrating receive processing hardware for each of two channels, a F-PDCH and a F-PDCCH, and channel a pilot. Double lines are shown whenever the signal is in complex (I & Q) form. The incoming signal "From RF" is received from a RF section, not shown, and includes I & Q samples at the chip rate. Three blocks receive the raw sampled signal, including a PDCCH correlator block 202, a Pilot Correlator 204, and a PDCH correlator block 206. Each of these blocks is shown as a plurality of blocks, stacked to indicate the probable presence of two or more instances, or "fingers," of each. The plurality of complex correlator fingers acts as a rake filter to separately process copies of signals that are slightly separated from each other in time. The time separations between copies may be due to natural multi-path reflections, or may be intentionally created using transmit diversity. The number of fingers to be provided is an engineering choice for each receiver design. The pilot correlation block 204 receives the complex signal and, for each finger, despreads it against the appropriate PN code. The results of the pilot correlator for each finger are provided to a corresponding finger of a channel estimator block 208. The channel estimator block provides channel estimates, which generally will differ for each finger, to be used for both the PDCCH and PDCH channels.

There are typically two PDCCH channels, PDCCH0 and PDCCH1. Accordingly, two channels of complex correlation and Walsh symbol despreading are provided in each block 202. A typical plurality of fingers is again indicated by the illustration of stacked or superimposed blocks. The complex I and Q symbols output from each finger of the complex correlator block 202 are provided to a corresponding finger of block 210 for phase correction, based upon input received from the corresponding finger of channel estimator 208. The modulation technique for the PDCCH is fixed in this exemplary receiver, and demodulation can therefore be undertaken without a need for further information. Accordingly, demodulation may be performed immediately, e.g., in a corresponding finger of the block 210. Demodulated (real) symbols are output from each finger of the block 210, and are passed to a Maximum Ratio Combiner (MRC) block 212 that operates to appropriately combine the outputs from all fingers to arrive at a single symbol stream. A de-interleaver block 214 corrects the order of the symbols, whereupon they are processed by a Viterbi Decoder block 216 to generate a best estimate for each symbol. The resulting PDCCH data is provided to a control block 218.

Like the PDCCH signal path, the PDCH signal path also includes a plurality of instances of a correlator block 220 and of a phase correction block 222, one for each receiver rake finger, as again indicated by the illustration of superimposed boxes for these blocks. As described above with respect to the PDCCH, all of the processing in these blocks 220 and 222 is duplicated according to the number of fingers employed by the particular receiver design. The PDCH processing, however, is capable of performing at a much higher bit rate than the PDCCH. In order to increase the bit rate, each finger of correlator block 220 includes 28 complex correlators to perform Walsh symbol despreading. Complex symbols from each finger of the correlator block 220 are provided to a corresponding finger of the phase correction block 222, where they are adjusted for phase in accordance with information from the corresponding fingers of the channel estimator 208. From the various fingers of the phase correction block 222, complex symbols are provided to a MRC block 224, where they are appropriately recombined. The single MRC block 224 for the PDCH signal path, and the complex symbols output from that block are stored in a symbol buffer 226. The symbol buffer 226 stores complex, undemodulated symbols for up to five slots.

In order to achieve high data transmission rates when possible, and yet to be tolerant of lower quality channels on which high data transmission rates are not possible, the modulation applied to the PDCH symbols at the transmitter may vary widely, ranging for example from QPSK to 16 QAM or higher. The demodulator block 228 does not have advance notice of the modulation scheme used by the signal. Accordingly, demodulation of the buffered symbols does not commence until the demodulator block 228 receives demodulation instructions from the control block 218. The control block 218, in turn, obtains the demodulation level from a message packet received concurrently on a PDCCH. The demodulation level cannot generally be obtained until the entire message has been received, despread, and decoded. The PDCH symbols, therefore, cannot be demodulated until after the complete packet has arrived and the PDCCH message has been interpreted. Accordingly, the symbol buffer 226 must store symbols for a period of time greater than the maximum packet length, which is typically four slots. Therefore, the symbol buffer 226 typically provides sufficient complex storage for the maximum number of symbols that can be transferred in five slots.

The demodulated symbols from the demodulator block 228 are then provided to a block 230 for de-interleaving. The block 230 also provides hybrid ARQ (automatic request for retransmission). A decoder block 232 is informed by the control block 218, for example in regard to a packet size, and applies Turbo-decoding to the de-interleaved symbols from the block 224 to produce PDCH data.

Multiple Access, Frames and Timing

Figure 3:
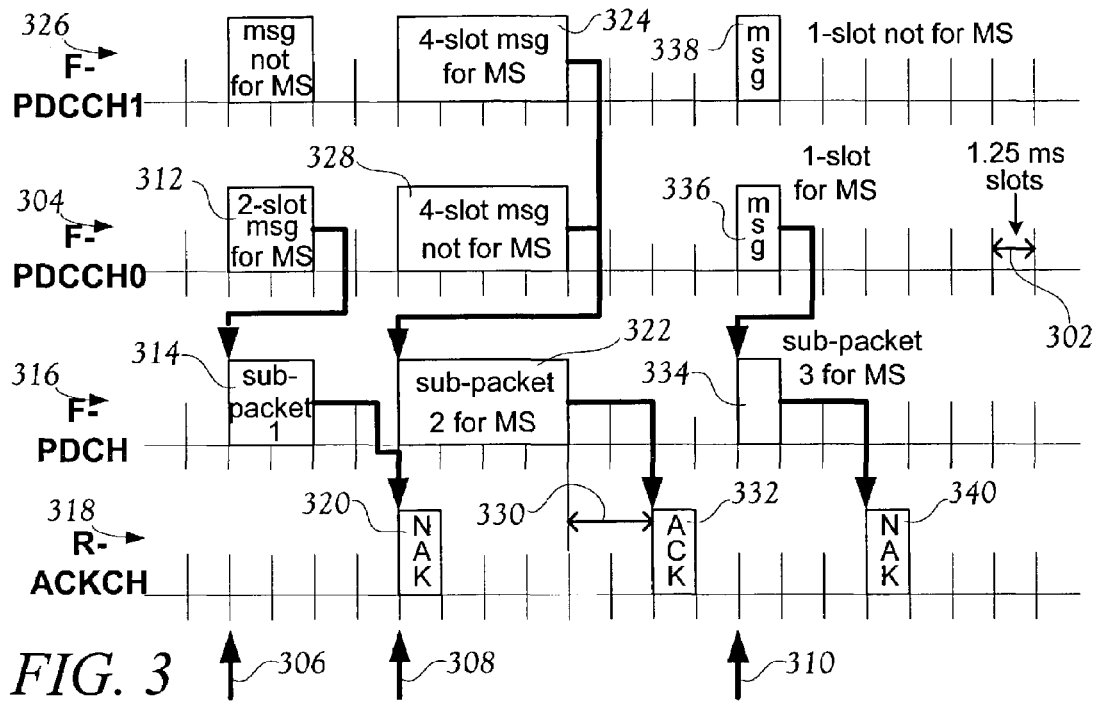
FIG. 3 is a timing illustration for packet communications in an exemplary EV-DV CDMA cellular system.

When a subject mobile station ("MS") is assigned to a packet data channel, the MS is assigned a Media Access Control (MAC) identifier, typically 8 bits, that uniquely identifies the MS on that channel. In order to provide concurrent access to the channel for a number of different MS receivers, the packet data channel is time division multiplexed (TDM), as illustrated in FIG. 3. Using timing established by the pilot channel, each channel is divided into 1.25 ms slots, such as a slot 302 of a forward packet data control channel 0 (F-PDCCH0) 304. Active connections may be concurrently maintained for a large number of users, with each user receiving data from time to time. In addition to such time division multiplexing (TDM), concurrent access to multiple MSs may be effected using code division multiplexing (CDM). Timing and details of such multiple access techniques are set forth below.

Data may be transferred in service data units (SDUs) that have a length that is selectable, by the serving BS, to be one to four slots. SDUs are generally sub-packets of an Encoder Packet, but such higher-level organization is not important for present purposes. Each SDU transmission begins at a transmission reference time $T_0$, such as reference times 306, 308 and 310.

Beginning at the transmission reference time $T_0$ 306, for example, a message 312 directed to the subject MS (i.e., identified with the MAC address of the subject MS) is transmitted on F-PDCCH0 304. Typically such a message indicates whether a concurrent transmission 314 on a F-PDCH 316 is a SDU that is intended for the MS, and contains further information (such as the applied modulation) to enable the MS to decode such SDU. Accordingly, a heavy bolded line in the FIGURES indicates that the results of complete processing of the message 312 are needed to begin to interpret the SDU 314. The SDU and message are the same length, but that length is generally not determined at the MS until the message 312 has been completely received, so that it can be confirmed as being completed. A reverse acknowledgement channel ("R-ACKCH") 318 may be used to acknowledge (ACK) or negatively acknowledge (NAK) correct receipt of a SDU on the PDCH.

An SDU, such as the SDU 314, must be completely received before it can be checked for accuracy. After the SDU 314 is received, it is decoded and checked against its CRC for validity. A decision can then be made as to whether an ACK or a NAK should be transmitted on the R_ACKCH 318. Accordingly, a delay ACK_DELAY 320 is provided between completion of a data SDU and transmission of acknowledgement on the R-ACKCH 318. The value for ACK_DELAY 320 may be set for a particular MS, and is typically one or two slots in duration. Here, a NAK 320 is transmitted, indicating that the sub-packet SDU 314 was not received correctly.

A transmission start time $T_0$ 308 reflects a beginning of a SDU 322, which has a length of four slots. It is merely coincidence that this time, $T_0$ 308, is concurrent with initiation of the NAK 320 transmission. A message 324 is transmitted on the F-PDCCH1 326, and (upon complete receipt) is interpreted to identify the SDU 322 as directed to the subject MS.

In addition to being multiplexed by time division, the F_PDCH 316 may be further multiplexed by division into two or more Walsh spaces, thereby providing code division multiplexing (CDM). A SDU 322 on the F-PDCH 316 may be assumed to be code division multiplexed between the subject MS and another MS. A concurrent four-slot message 328 on the F-PDCCH0 304 is not intended for the MS, but it contains (in this case) information specifying which Walsh codes are assigned to the other MS that is also receiving a packet on the F-PDCH concurrently with the SDU 322. The subject MS needs the Walsh space assignment for the other MS in order to determine, by negative implication, the Walsh code space that applies to the SDU 322 within the F-PDCH 316. Accordingly, both F-PDCCH channels need to be analyzed before interpretation of the SDU 322 can commence, as is indicated by the heavy bolded arrow pointing to the leading edge of the SDU 322. During the two slots provided by an ACK_DELAY 330, the entire four-slot SDU 322 is received and checked for accuracy, whereupon an ACK 332 is returned to the serving BS on the R-ACKCH 318.

A single-slot SDU 334 begins at a transmission reference time $T_0$ 310. The SDU 334 will be interpreted after a concurrent one-slot message 336 on the F-PDCCH0 304 is analyzed to obtain appropriate control information, such as the target MS, length and modulation scheme, for the SDU 334. A concurrent one-slot message 338 on the F-PDCCH1 326 is not intended for the MS. In an exemplary CDMA EV-DV system, a message on the F-PDCCH1 326, such as the message 338, will not be a source of information for the subject MS when the MS receives a concurrent message on the F-PDCCH0 304. To complete the timing for a one-slot SDU, in this instance the MS fails to correctly receive the SDU 334, and accordingly the MS transmits a NAK 340 on the R-ACKCH 318 after two slots of ACK_DELAY.

Figure 4:
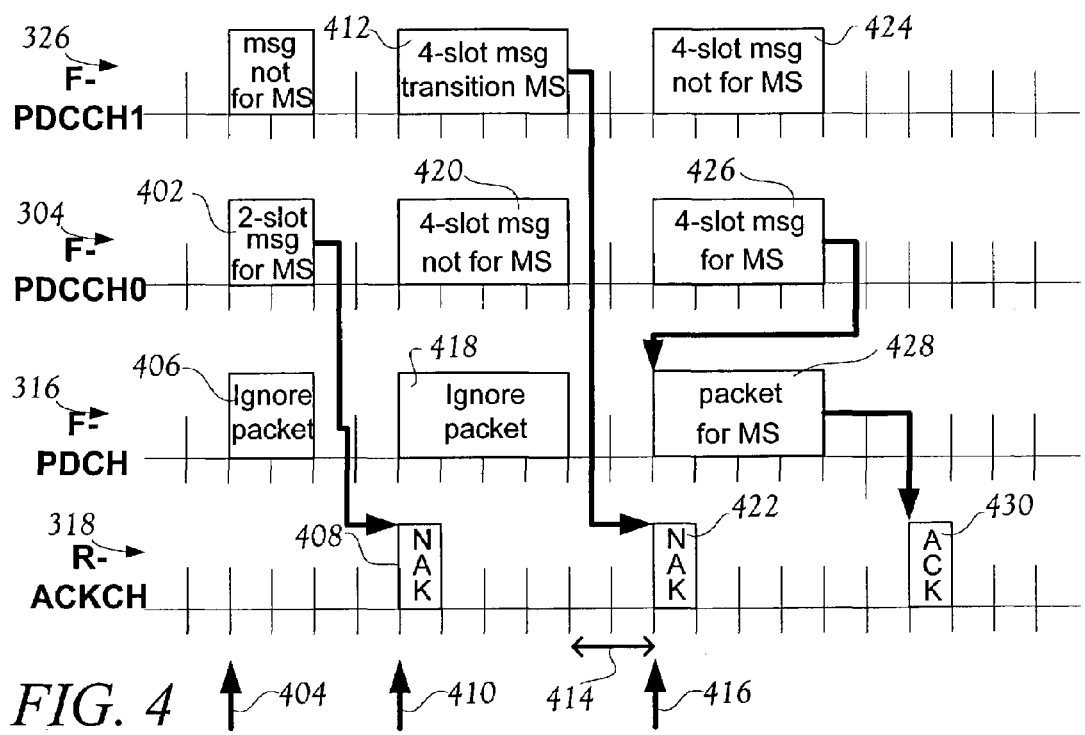
FIG. 4 is a timing illustration as in FIG. 3, particularly showing timing for an exemplary transition from reduced receive signal processing to full receive signal processing.

Further examples of timing for a F-PDCCH0 304, a F-PDCCH1 326, a F-PDCH 316 and a R-ACKCH 318 are illustrated in FIG. 4, and discussed in the associated text.

Control Hold State and Reducing MS Power Dissipation

In view of the ability to service numerous MSs concurrently on a single PDCH using multiple access techniques, sharing of a PDCH by a multiplicity of users is to be expected. As such, the subject MS will often have periods of time during which it is not receiving data. In order to save power, these periods of time may be associated with a special state in which advantage may be taken of the reduced receipt of data to permit a reduction in power consumption. Such state may be referred to generally as a "reduced receive processing" state. However, a "Control Hold" state has been previously defined for other purposes in previous standards work pertaining to CDMA EV-DV. The Control Hold state has characteristics that may permit it to be utilized for a "reduced receive processing" state. When the term "Control Hold" is used herein, in general it may alternatively be treated as referring to any reduced receive processing state, except in the context of a particular exemplary CDMA EV-DV system.

During a Control Hold state, certain channel-quality information that a MS is ordinarily required to transmit on a reverse channel quality indication channel ("R-CQICH") is reduced in frequency or "gated." CDMA systems, such as the exemplary system, employ complicated gating rules to reduce transmission power in the MS during the Control Hold state.

It is always desirable to minimize power consumption in a MS, which is typically powered by a battery having limited storage capacity. Transmitting is often assumed to consume more power than receiving. As such, procedures for minimizing transmission duration and power level, such as gating the R-CQICH, are often implemented when power reduction is sought. Reducing receive signal processing may not be considered an important issue for reducing power consumption for CDMA MSs.

However, as described in detail above, EV-DV (data-voice) communications, such as the exemplary CDMA EV-DV system, are typically time division multiplexed. As such, even while a connection is active and a MS is configured to receive data from a particular BS, the MS may in fact receive data just a small fraction, such as $\frac{1}{16}$, of the total active connection time. Conversely, then, a MS, when operating in a multiplexed environment is likely to spend a predominant portion of time, during an active connection with a BS, receiving data that is not directed to the MS.

The Applicants have determined that a substantial amount of power is dissipated by the processing of received signals required for CDMA EV-DV systems. Referring for a moment to FIG. 2, for example, the four blocks 220, 222, 224 and 226 must all be fully active in order to retain information from the PDCH in a form that can be further processed and transferred to the upper signaling layers if it is found to be intended for the MS. Demodulation in block 228, and other processing, occurs only after the modulation scheme and coding information is derived from a concurrent PDCCH message. However, because of the high data rates of which the PDCH is capable, extensive receiver processing hardware is active in each finger of the PDCH receive chain while a PDCH signal is being received. For example, each of the fingers includes twenty-eight complex correlators in block 220, twenty-eight phase correction sections in block 222, and a MRC in block 224. Moreover, all of the complex symbols received in SDU 322 of FIG. 3 must be stored in the buffer 226. Using presently known techniques with typical hardware, all of this processing has been closely estimated to consume substantially more than half of the power dissipation of the subject MS, during times when it is not actually receiving data. As noted above, data may in fact not be received during a substantial majority of the active connection time. Accordingly, reducing receive signal processing during periods when no data is intended for the MS may significantly reduce power consumption and thereby extend MS battery life.

However, with reference to FIG. 3, messages such as 324, which direct the disposition of SDUs such as 322, are aligned in time with the SDUs that they direct. Accordingly, a MS cannot ignore data on the PDCH because it may determine, after the signal is gone, that it should have been saved. Therefore, the MS appears to have no option except to process all incoming signals on the PDCH. Nonetheless, in order to reduce receive processing power dissipation under such circumstances, it is desirable to avoid the apparent need of processing all incoming PDCH signals. Unfortunately, such avoidance is incompatible with previous practices. An approach for escaping this conundrum is set forth below.

During Control Hold, the subject MS is not receiving data on the PDCH. If the MS is notified in advance that it must return to an active state because a data packet is expected, then as long as it is in a state in which no packets are expected, it may ignore incoming data on the PDCH. If so, then it may curtail receive processing of PDCH signals until after being instructed to resume.

The Control Hold State is thus a good example of a "reduced receive power period" during which the MS could possibly reduce receive processing. The Control Hold State may be differently defined, and other states may be identified during which a reduction in receive processing is practical. Accordingly, it should be understood that any other appropriate state, during which receive power may be reduced, may be substituted for Control Hold State, as that term is used herein.

The F-PDCH consumes substantial power during receive processing, and is thus a good candidate for a channel that should be ignored during a reduced receive power period. However, other channels may also be appropriate for receive processing reduction, some of which are described below in more detail. Receive processing may be minimized by reducing processing as far as possible on all channels that are not essential during a reduced processing state. However, if processing is reduced for only some of the nonessential channels during a reduced processing period, then less complex procedures may suffice. The actual channels for which receive processing is reduced will be selected to achieve an engineering balance between factors such as the amount by which power loss might be reduced, the effort required to implement such reductions, and the compatibility of such reductions with system standards.

Any category of receive processing, including sample processing, demodulation, organizing received data, and/or decoding, may be excluded during a reduced processing period in order to reduce power consumption due to receive processing. A first processing reduction approach is to completely ignore a received signal channel, thereby avoiding all categories of receive processing. A second processing reduction approach is to perform raw sample processing only, so as to obtain buffered sample data for a particular channel, but to withhold further receive processing of the particular channel. Other receive processing reduction techniques may also be utilized.

Returning From Control Hold to Active State

A subject MS that is in a reduced processing state, such as Control Hold, must return to an active state at an appropriate time in order to fully process data directed to it. A BS may notify a MS to return to the Active state to accept a scheduled SDU. Such notification should precede the transmission start time of the SDU intended for the MS by a time period that sufficiently allows the MS to restore the (previously reduced) receive processing. A good candidate for such notification is a message on a F-PDCCH that precedes the SDU scheduled for the subject MS.

If notification cannot sufficiently precede transmission of a SDU to the MS, then the second reduction processing approach (described above), in which the raw sample processing is performed so that buffered raw data is obtained, may be required to prevent the data from being "lost." Therefore, when using the second reduction approach, the MS need not be notified in advance that data on the F-PDCH is intended for it. However, the second reduction approach does not permit all receive processing to be suspended for the F-PDCH.

A F-PDCCH is a good candidate for notifying a subject MS to return to an Active state. It should be understood that any appropriate channel may be used for such purpose, though F-PDCCHs are the primary example that is presented herein. An appropriate notification channel should be receive processed sufficiently often to provide notice to a MS to return to the Active state before a data packet transmission begins. Therefore, a notification channel should not have excessive latency. Notification is typically provided on a single notification channel at a time, but a plurality of channels may also be employed.

A channel may serve the purpose of notification by merely being activated or deactivated for purposes of a target MS. Thus, a channel need carry no specific information to serve as notification. However, in multiplexed systems such as the exemplary CDMA cellular EV-DV described (in relevant part) herein, it is often convenient to have channels constantly active, and then to direct information on such channels to different receivers by means of an address provided with such information. In this manner, a channel may be activated or deactivated with respect to a particular MS. A MAC address that previously has been noted as a feature of the exemplary system is a good candidate for such an address. Although a MAC address is the only example of such an address that is described herein, the skilled person will understand that any other address or target identifier may be used for this purpose. Addressing activates a channel with respect to a particular addressee, and thus is a particular example of the general activation/deactivation technique set forth above.

One alternative to reliance upon some form of activation of a channel with respect to the MS, such as addressing, involves presenting specific information on a channel that the MS will interpret, by a known convention, as a specific direction to return to an Active state. Thus, if a channel is already actively received by a subject MS, then particular information carried on the channel may be interpreted, according to a known convention, as an instruction to the MS to return to an Active state. Any particular combination of data may be used for this purpose, assuming that the convention is accepted by both serving BS and subject MS.

A combination of such alternatives may serve the purpose of notification while providing increased flexibility to the system. As an example of such a combination, particular data (one alternative) may be presented upon a channel that is addressed to a target (a second alternative). Employing a combination of techniques permits each of the component techniques to be used separately without triggering a return to an active state, as described below with reference to FIG. 4.

FIG. 4 illustrates a specific example in which a combination of features serves as notification to a MS to return to the Active state, but either feature alone does not. The combination of features upon which FIG. 4 is based includes: 1) addressing a message using a MAC address of the target, and 2) additionally providing specific information in the form of a "null" value for a particular quantity (Encoder Packet length or EP length) that is accepted by known convention to be an indicator of notification.

In the particular circumstances represented in FIG. 4, the subject MS is initially in a Control Hold state, during which receive processing of the PDCH is entirely suspended. The subject MS is configured to return to full processing of the PDCH only after identifying a notification message on a PDCCH that includes the MAC address of the MS in combination with a "null" value in the EP length field. In this example, the MS transitions to the Active state at a time that follows, by a predetermined transition delay, complete receipt of the notification message.

A two-slot message 402 is presented on the F-PDCCH0 304, beginning at a transmission reference time $T_0$ 404. The message may contain an instruction that is unrelated to a data packet, such as an instruction to increase the gating rate on the CQICH, for example. It does not, however, contain the specific trigger data of a "null" value for EP length. Because the MS is in a Control Hold state, it is not storing symbols from the F-PDCH 316, and accordingly, the SDU 406 is ignored. The MS may then acknowledge receipt of the instruction message by transmitting a NAK 408, after the appropriate ACK_DELAY of two slots. NAK may be employed, rather than ACK, to indicate acknowledgement of a message that is not accompanied by a data packet, and thereby to distinguish from acknowledgement of correct receipt of a data packet SDU. Failure to correctly receive the message need not be acknowledged at all. Other forms of acknowledgement may also be used, such as messages on another channel, or acknowledgement may be omitted altogether.

At a transmission reference time $T_0$ 410, a four-slot message 412 commences. After the message 412 is completely received, it is identified as containing both the MAC address for the MS and the "null" value for EP length. Accordingly, the message 412 will trigger the MS to return to an Active state. In order to permit time to interpret the message 412 and to return to full receive processing on the F-PDCH 316, a transition delay 414 is permitted to pass before the MS returns to the Active state at a time 416. The transition delay 414 serves a similar purpose as the ACK_DELAY, and accordingly, the transition delay 414 may be given the same value that is determined to be appropriate for the ACK_DELAY. By convention, any value may be used for the transition delay, but longer values will increase a latency period for initial data transmissions to the MS. Employing ACK_DELAY for this purpose avoids a requirement to store a separate communications parameter.

Until the time 416, the MS remains in the Control Hold state. Accordingly, the MS ignores a SDU 418 that is concurrently transmitted with the message 412. Moreover, because the MS will not be demodulating the SDU 418, a message 420 contains no useful information (such as designation of Walsh codes not to be used) for the MS, and is thus not relevant to the MS. This circumstance is indicated by the absence of a connection to the thick arrow from the message 412. A NAK 422 may be transmitted at the end of an ACK_DELAY, coincidentally at the time 416.

The MS is in Active state by the time 416, and consequently data may be directed to the MS on the F-PDCH 316. Accordingly, the MS thereafter stores spread, undemodulated symbols received on the F-PDCH 316. A message 426 addressed to the MS on the F-PDCCH0 304 indicates that a concurrent SDU 428 has data directed to the MS, and also provides information needed to decode such data. After interpreting the message 426, the MS then directs further processing of the raw symbols stored for the SDU 428. In an alternative embodiment, the MS begins further processing of the raw symbols as they become available. A message 424 on the F-PDCCH1 326 is not directed to the MS. By one possible convention, the presence of a message on F-PDCCH0 that is addressed to a particular MS precludes the presence of a concurrent message on the PDCCH1 326 for the particular MS. Accordingly, if this convention is in force, the MS need not look at the data in the message 424 at all. To complete this packet process, in this case the SDU 428 is correctly decoded, and therefore the MS transmits an ACK 430 on the R-ACKCH 318 after the appropriate delay.

Thus, by requiring two concurrent events to return to Active state, the MS is able to receive messages that are specifically addressed to it, such as the message 402, without unnecessarily returning to an Active state. A different form of activation of a F-PDCCH with respect to the MS also avoids an unnecessary return to an Active state. A global address may be used that does not specify the MS MAC address, but rather indicates that the message is to be accepted by the MS. In this circumstance, the F-PDCCH is made active with respect to the MS, yet neither of the criteria for returning to the Active state (i.e., address and data) is provided to the MS. The MS is therefore not instructed to exit the Control Hold state.

Figure 5:
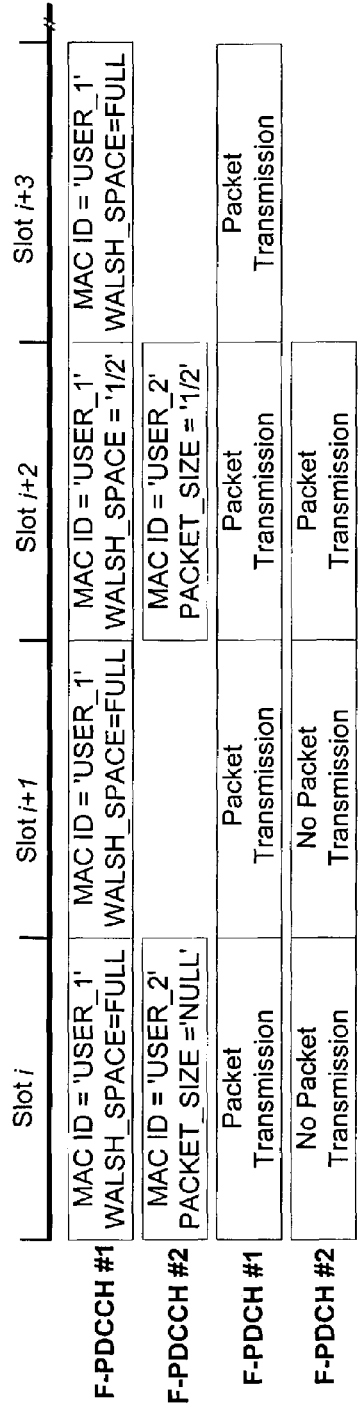
FIG. 5 is a block diagram showing timing and activity relationships for a control channel and a data channel, for each of two users, during a transition from Control Hold to Active state.

FIG. 5 illustrates timing of a Control Hold to Active transition when one slot is used for both the ACK_DELAY and for the transition delay. Two different users, #1 and #2, are represented. Signals on a F-PDCCH and on the F-PDCH for User #1 are shown, and the corresponding signals are shown for User #2. Prior to Slot i, User #1 is in an Active state, while User #2 is in Control Hold state. For simplicity, each SDU in FIG. 5 is one slot in length.

In Slot i, the F-PDCCH for User #1 (F-PDCCH #1) is addressed and told to recover data from the entire Walsh space of the F-PDCH. Accordingly, the F-PDCH for User #1 (F-PDCH #1) contains a SDU packet for User #1. User #2 is in Control Hold state, and will thus ignore any packets; accordingly, no packet is transmitted to User #2 on the F-PDCH for User #2 (F-PDCH #2). However, User #2 receives a message on the F-PDCCH #2 that directs it to transition to Control Hold, including both its MAC ID and a special code.

Slot i+1 is coincident with the transition delay of one slot that is provided to permit time to interpret a PDCCH message and begin full receive processing on a F-PDCH. User #2, accordingly, is still in Control Hold state, and, as such, does not receive a packet on the F-PDCH #2. User #1, however, again receives a F-PDCCH #1 message and accepts a packet on the F-PDCH #1.

In Slot i+2, following the one-slot (in this case) transition delay, User #2 enters an Active state. The serving BS therefore chooses to split the F-PDCH between User #1 and User #2, assigning half of the available Walsh space to each user. Accordingly, each User receives a message on its respective F-PDCCH to acquire data from half of the Walsh code space on the (shared) F-PDCH. Therefore, both users show packet transmission on the (shared) F-PDCH.

In Slot i+3, no data on the F-PDCH is directed to User #2, while User #1 is again assigned the entire Walsh space the F-PDCH. User #2 receives neither message nor packet, even though it is now in the Active state and is receive processing the entire PDCH, at least to the point of storing the raw (i.e., still modulated) complex symbols for later demodulation and decoding.

The foregoing examples demonstrate effects of some techniques by which a MS may be notified of a need to return to full receive processing from a reduced receive processing state. The particular technique chosen affects system capabilities, such as flexibility in signaling. Single events may be chosen to effect notification, such as activation of a particular channel, addressing a target receiver on a channel, or providing particular data on a channel. More flexibility may be achieved if a combination of such events is employed to notify a target MS. Any combination of such events may be employed. A typical combination includes MAC addressing of the target MS, together with particular data disposed within a packet thus addressed.

Figure 7:
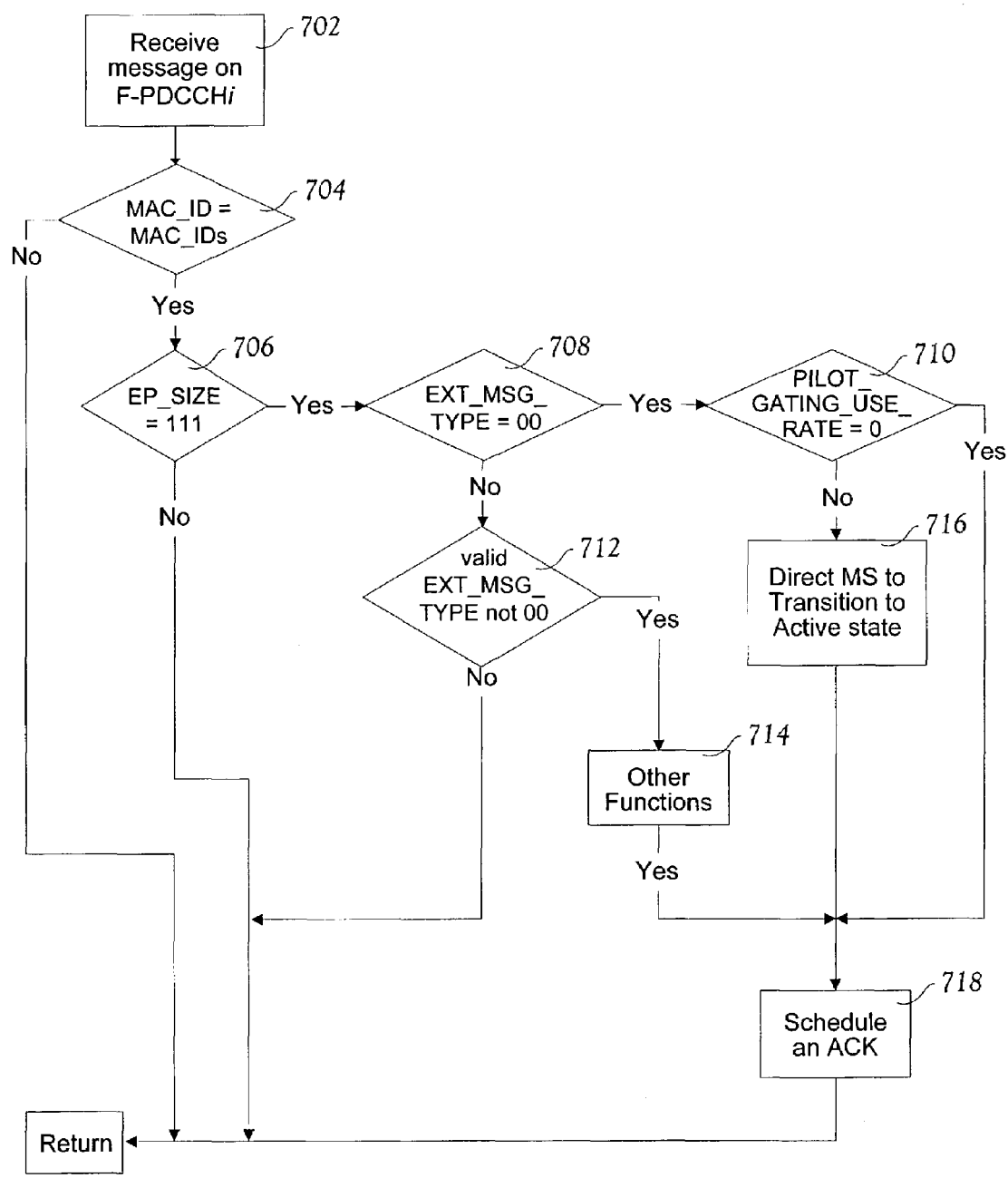
FIG. 7 is a flow chart illustrating exemplary steps by which a MS may transition to an Active state from a Control Hold state.

FIG. 7 is a flowchart illustrating steps that a MS, presently in a Control Hold state, may follow to transition from the Control Hold state to an Active state. Block 702 indicates that a message is being processed on a PDCCHi. A decision block 704 determines if such a message includes a MAC address (MAC_ID) that matches the MAC address of the MS (MAC_IDs), in which case processing continues at the decision block 706. If the MAC address does not match, then the message is not relevant for transition to the Active state, and accordingly processing in this regard terminates. Otherwise, at the decision block 706, a particular data field, EP_SIZE, is tested for equality to a "null" value 111. If the data field EP_SIZE is not 111 then the message is not relevant for transition to the Active state and processing terminates.

Otherwise, processing continues at an optional decision block 708 to test for the message type. This block may be included to permit re-use, for purposes other than transitioning from the Control Hold to the Active state, of the combination of MAC address and specific data identified thus far (i.e., the MS MAC address together with EP_SIZE=111). If this decision block is not implemented then processing will proceed directly to a decision block 710. If the decision block 708 is implemented, then processing continues at the decision block 710 for only one particular value of a variable EXT_MSG_TYPE (extended message type), for example the value 00. Otherwise, processing may branch to a decision block 712 to check for valid message types other than type 00. If such other valid message type is found then processing may continue to a block 714 to perform corresponding functions before returning.

If the optional decision block 708 is not implemented, or if EXT_MSG_TYPE=00, then processing continues, from the 'yes' branch of decision block 706, to the decision block 710. If the MS is in the Control Hold state, then PILOT_GATING_USE_RATE=1, in which case the decision block 710 returns 'no' and processing continues at a block 716. In the block 716, the upper layers of the MS are notified that traffic has been received, and that the MS should transition to the Active state from the Control Hold state. In block 718 an ACK is scheduled if a command is to be acknowledged and processing then returns.

Entering Control Hold State

A MS needs to recognize entry into a Control Hold state (or any other reduced receive processing state) in order to respond by appropriately reducing receive processing effort. A serving BS also needs to recognize that a MS is in the Control Hold state, so that it may efficiently direct the MS to return to full processing in sufficient time to accept an intended data packet. A mechanism employed to cause entry into the Control Hold state preferably avoids unnecessary signaling overhead, and permits a MS to be in the Control Hold state as much of the time as possible to reduce MS power dissipation.

A subject MS may enter the Control Hold state automatically, in accordance with a predetermined trigger. The trigger condition may, for example, consist of a selected number ("entry threshold") of Transmission Periods during which the MS receives no data. Entry to the Control Hold state, however, requires an "entry delay" following the trigger condition to allow the MS to recognize and act on the trigger. One convention would set the entry threshold to a single transmission period, and the entry delay to a single slot. This particular convention maximizes the time during which a MS is in the Control Hold state, thus minimizing power consumption. However, some potential disadvantages accompany this convention. For example, the Control Hold state does not just affect receive processing, but it also involves gating the reverse pilot signal, and frequent entry into and out of this state may be inconvenient for engineering reasons. To alleviate this particular inconvenience, the Control Hold state may be separated from the reduced receive processing (RRP) state, such that entry into the RRP state does not require processing changes that are associated with the Control Hold state.

Another possible disadvantage to a convention specifying automatic entry into the Control Hold state after a single transmission period that contains no data for the MS is a need to direct a transition to the Active state before every discontinuous data transmission. This disadvantage may be alleviated by queuing data for particular MSs and transmitting the data in bursts. Moreover, the disadvantage is not severe, because notification of the target MS need not interfere with data transmissions to other MSs, as may be seen from the description of FIG. 6 below.

Figure 6:
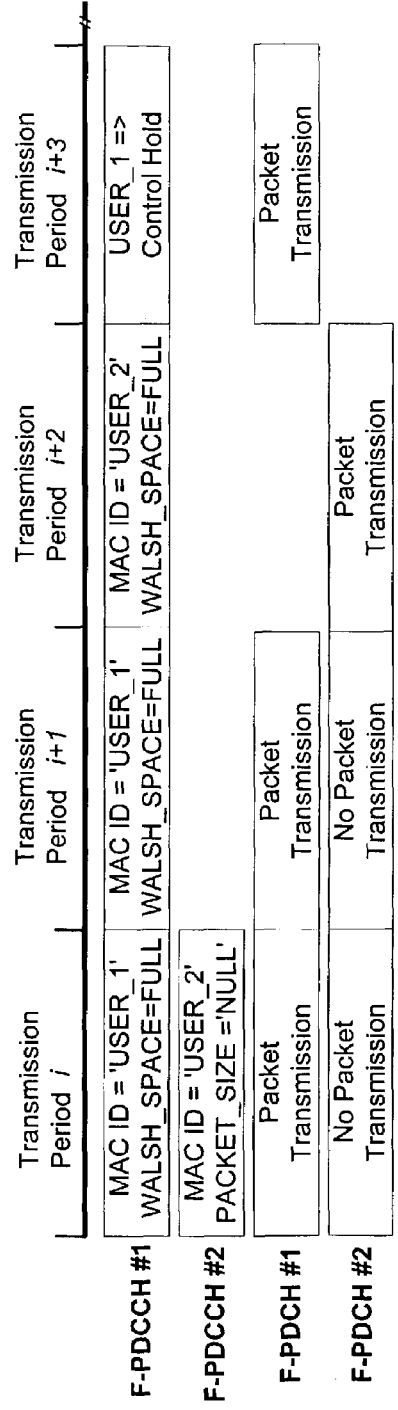
FIG. 6 is a block diagram of channel timing and activity for two users as in FIG. 5, illustrating a transition from full (Active state) to reduced (Control Hold state) receive processing.

FIG. 6 illustrates a transition to the Control Hold state for a User #1. Each Transmission Period (TP) may be one, two, four, or any other number of slots in length, in accordance with protocols for the system. During a TP i, User #1 is notified on F-PDCCH#1 to accept a packet on F-PDCH#1 (using the full Walsh space of the F-PDCH). User #2 is notified to return to the Active state, by means of a message on F-PDCCH#2 that includes the MAC address for User #2, as well as data ("null" for packet size) that is recognized by known convention.

During TP i+1, User #2 is interpreting the message received during TP i, and thus receives no data. During the same period, User #1 is again assigned the entire Walsh space in a SDU packet on the F-PDCH#1. By TP i+2, User #2 transitions to the Active state. User #2 is notified in a message on F_PDCCH#1 to accept data from a full Walsh space of F-PDCH#2. This assumes that either TP i+1 was longer than one slot, or that the transition delay comprises only one slot.

User #1 receives no data in TP i+2, because the entire bandwidth (Walsh space) of the F-PDCH is used for User #2. Accordingly, in TP i+3 User #1 transitions to the Control Hold state (or other reduced receive processing state). A packet on the F-PDCH may be directed, for example, to another user of the system. No message on a F-PDCCH is illustrated that would indicate data is directed to User #2 during TP i+3. Accordingly, it may be assumed that User #2 will return to the Control Hold state during the next transmission period (not shown).

Automatic entry into the Control Hold state may impose inconvenient constraints on packet scheduling. A MS may mitigate some of these constraints by increasing the entry, whether in terms of slots or transmission periods, to a value greater than one. FIG. 6 illustrates an example in which HOLD_ENTRY is chosen to be a delay of one slot. However, HOLD-ENTRY may be increased, for example, to a larger number such as eight or sixteen slots, or any value that is empirically determined as a good balance between reducing power consumption and simplifying a need for Hold to Active Transition messages. HOLD_ENTRY may also represent a quantity other than slots, such as clock time, or transmission periods (of varying length) as noted above. After a HOLD_ENTRY number of units without receiving data, the MS enters a reduced receive processing state (e.g., Control Hold). The BS and the MS each independently determine when the MS enters the Control Hold state, in accordance with an agreed known convention.

The MS itself may determine and control automatic entry into the Control Hold state. The MS may evaluate some or all of various conditions, which for example may include battery charge level, traffic rate, signal strength, and/or a quality of service (QoS) negotiated by the user. Based on values for selected conditions, the MS may determine an appropriate time to enter a reduced receive processing state (e.g., the Control Hold state). The MS may be required by convention to transmit a notification of such transition to the BS sufficiently in advance of entering the reduced receive processing state. Such notification should permit sufficient time for the BS to send an instruction to return to the Active state before it sends a further data packet.

The MS may enter the Control Hold state upon being instructed to do so by a serving BS, rather than entering automatically after a selected delay. Each MS may have a quality of service (QoS) associated with it. A BS may provide a certain amount of transmission bandwidth to each MS in accordance with bandwidth availability and QoS until a queue for the MS is empty. Moreover, the BS may schedule transmissions to the MS in bursts, and may direct the MS to enter the Control Hold state between such bursts.

Techniques for directing a target MS to transition from the Active state to the Control Hold state may be selected analogously with the techniques set forth above for directing a subject MS to transition from the Control Hold state to the Active state. Thus, activation of an agreed channel, or activation to a target MS by including an address (such as the MAC address) for the target MS may be used as one technique. Particular data agreed upon by known convention may be used as another technique. Either or both of these techniques may also be used in combination. As one example, the identical message may be used as a "toggle" direction, such that a MS in Control Hold transitions to Active upon receiving the direction, while a MS in Active state transitions to Control Hold upon receiving the same direction. Alternatively, a unique combination of notification techniques may be employed. For example, notification may be effected by transmission of a packet on a F-PDCCH that includes a MAC address of the target MS, included in a packet on a F-PDCCH with data, agreed upon by known convention, that differs from data chosen to direct transition from the Control Hold to the Active states.

Automatic and BS-directed techniques for entry into the Control Hold state may also be combined. For example, a MS may automatically enter the Control Hold state after receiving no SDUs for 32 slots, and may enter the Control Hold earlier upon explicit direction from the serving BS. Alternatively, a MS may determine to enter the Control Hold state at a time that is calculated from various parameters, rather than being predefined by a convention, and may also enter Control Hold upon instruction from the BS.

CONCLUSION

The foregoing description illustrates exemplary implementations, and novel features, of aspects of a method and apparatus for reducing receive power loss in packet data transceivers. While some suggestions are provided for alternative uses and implementations of the method and apparatus, it is of course not practical to list or describe such alternatives exhaustively. Accordingly, the scope of the presented invention should be determined only by reference to the appended claims, and should not otherwise be limited by features illustrated herein except insofar as such limitation is recited in an appended claim.

While the above description has pointed out novel features of the invention as applied to various embodiments, the skilled person will understand that various omissions, substitutions, and changes in the form and details of the methods and systems illustrated may be made without departing from the scope of the invention. For example, the skilled person will be able to adapt the details described herein to communications systems having a wide range of modulation techniques, transmitter and receiver architectures, and generally any number of different formats.

Each practical and novel combination of the elements described hereinabove, and each practical combination of equivalents to such elements, is contemplated as an embodiment of the invention. Because many more element combinations are contemplated as embodiments of the invention than can reasonably be explicitly enumerated herein, the scope of the invention is properly defined by the appended claims rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element insofar as possible without also encompassing the prior art.

What is claimed is:

1. A method of reducing power consumption by a mobile station during an active CDMA data-voice connection, the method comprising:
   a) establishing a CDMA data-voice connection between a mobile station ("MS") and a base station ("BS") employing initial levels of receive processing on a plurality of physical channels;
   b) identifying a suspended transfer state during which the MS will not receive data on at least a particular one of the plurality of physical channels for a duration that is not predetermined; and
   c) reducing the receive processing of a signal on the particular channel;
   d) continuing to receive process at least one notification channel during the suspended transfer state;
   e) receiving, on the notification channel at the MS, an indication of a need to transition from suspended to active transfer state, the indication including
      i) a MAC address, corresponding to the MS, that is disposed in data of a notification packet transmitted on the notification channel, and
      ii) a predetermined group of data bits, separate from the MAC address within the data on the notification channel, that have been set to predetermined values; and
   f) consequently returning receive processing of the particular channel to the initial level.

2. The method of claim 1, wherein the suspended transfer state is a Control Hold state, and the particular channel is a forward packet data channel (F-PDCH).

3. The method of claim 2, wherein a BS delays transmission on the F-PDCH to a MS in the Control Hold state for a period not less than a value ACK_DELAY.

4. The method of claim 1, wherein reducing the receive processing includes suspending raw sample processing of signals of the particular channel.

5. The method of claim 1, wherein the notification channel is one of a plurality of forward packet data control channels (F-PDCCHs) that are fully receive processed by the MS during the suspended transfer state.

6. The method of claim 1, wherein the notification channel is a predetermined one of a plurality of F-PDCCHs, and the MS fully receive processes no other F-PDCCH during the reduced transfer state.

7. The method of claim 1, further comprising returning receive processing to the initial level at a predetermined time after receiving the indication of a need to transition to active transfer state.

8. A method of transitioning from a control hold state to an active state in a cellular communications system mobile station ("MS"), the method comprising:
   a) suspending attention to content of a first channel during a control hold state;

b) processing a transition signal packet received by the MS during the control hold state on a different second channel;

c) determining that the transition signal packet contains information directing termination of the control hold state; and d) transitioning to an active state, including resuming attention to content of the first channel by the MS, within a predetermined "number of transmission slot durations" subsequent to receipt of an entirety of the transition signal packet.

9. The method of claim 8, wherein the transition signal packet occupies one to four communication slot periods, and the predetermined time period is equal to two communication slot periods.

10. The method of claim 8, wherein the first channel is a forward packet data channel (F-PDCH), and the second channel is selected by a serving base station (BS) from among a plurality of forward packet data control channels (F-PDCCHs) received by the MS.

11. The method of claim 8, wherein the act c) of determining information directing termination further comprises identifying, within data conveyed by the transition signal packet, an address associated with the MS.

12. The method of claim 11, wherein the act c) of determining information directing termination further comprises identifying, within data conveyed by the transition signal packet, a predefined set of bits having a pattern of values that is predefined irrespective of MS address.

13. The method of claim 8, wherein the second channel is a predetermined one of a plurality of forward packet data control channels (F-PDCCHs) received by the MS, further comprising reducing receive processing of all other F-PDCCHs during the control hold state.

14. A method of reducing power consumption by a mobile station during an active CDMA data-voice connection, the method comprising:

a) establishing a CDMA data-voice connection between a mobile station ("MS") and a base station ("BS") employing active levels of receive processing on a plurality of physical channels;

b) a step for entering a limited data communication state;

c) a step for reducing received signal processing during the limited data communication state; and d) a step for identifying a received instruction to restore received signal processing to the active levels by returning from the limited communication state, wherein the instruction includes both data that identifies the instruction as associated with the MS, and particular separate data bits that are set to predetermined values.

15. The method of claim 14, wherein the step for reducing received signal processing includes suspending complex correlation processing for at least one data channel.

16. The method of claim 14, wherein the step for reducing received signal processing includes suspending storage of partially processed signal information for at least one data channel.

17. The method of claim 14, wherein the step for entering a limited data communication state includes entering the state if either (a) data is not received on a data packet channel for a predetermined number of communication units, or (b) an instruction to enter the state is received.

18. The method of claim 14, wherein the step for identifying a received instruction includes identifying, within a received message, both an address that reflects the MS, and particular data indicative of a transition instruction.

19. Mobile apparatus for receiving cellular telecommunication signals, comprising:

a) a receiver unit configured to concurrently receive a plurality of physical communication channels, including a packet signaling channel and a packet data channel, the receiver unit having processing facilities for the packet data channel including i) raw signal processing blocks configured to derive and store symbols conveyed on the packet data channel, and ii) symbol processing blocks configured to demodulate and decode the stored symbols; and b) a control unit configured to i) temporarily place the mobile apparatus into a reduced receive processing state upon appropriate entry conditions, and to ii) cause the mobile apparatus to exit the reduced receive processing state within a predetermined number of transmission slot durations after receiving a transmission instructing such exit;

c) wherein the processing facilities for the packet data channel are configured to suspend receive processing of the packet data channel while the mobile apparatus is in the reduced receive processing state.

20. The apparatus of claim 19, wherein the processing facilities are configured to suspend receive processing in at least one of the raw signal processing blocks while the mobile apparatus is in the reduced receive processing state.

21. The apparatus of claim 20, wherein instructions needed to demodulate a particular packet on the receive data packet channel are derived from a concurrent message packet on the packet signaling channel.

22. The apparatus of claim 21, wherein d) the mobile apparatus is a data-voice capable CDMA transceiver;

e) the raw signal processing blocks include a plurality of fingers each having a multiplicity of complex correlators for Walsh symbol despreading, a maximum ratio combiner to derive complex symbols from combined outputs of the fingers, and a symbol buffer configured to store a number of complex symbols exceeding a number of such symbols receivable by the transceiver during four transmission slots;

f) the packet data channel is a forward packet data channel (F-PDCH), and processing is suspended in substantially all raw signal processing blocks of the F-PDCH while the mobile apparatus is in the reduced receive processing state; and g) the transmission instructing the mobile apparatus to exit the reduced receive processing state includes a combination of A) signal activation with respect to the apparatus by means of an indication that the transmission is expressly directed to the mobile apparatus, and B) specific data which, by convention, is indicative of such instruction.

23. The apparatus of claim 19, wherein the appropriate entry conditions include:

d) an absence, for a predetermined number of communication units, of data packets directed to the apparatus; and e) a signal received on a packet signaling channel, including an identifying address of the apparatus and data conveying a direction to transition out of the reduced receive processing state.

24. The apparatus of claim 19, wherein the raw signal processing blocks comprise a plurality of fingers of complex correlators for each of a multiplicity of Walsh symbol despreaders.

25. The apparatus of claim 19, wherein the processing facilities for the packet data channel are configured to suspend substantially all processing in all raw signal processing blocks while the mobile apparatus is in the reduced receive processing state.

26. The apparatus of claim 20, wherein the transmission instructing the mobile apparatus to exit the reduced receive processing state includes a combination of A) signal activation with respect to the apparatus by means of an indication that the transmission is expressly directed to the mobile apparatus, and B) specific data which, by convention, is indicative of such instruction.

27. The apparatus of claim 26, wherein receive processing is not reduced on the packet signaling channel while the mobile apparatus is in the reduced receive processing state.

28. The method of claim 7, wherein the predetermined time after receiving the indication is set equal to an ACK delay value number of transmission slots.

29. The method of claim 28, wherein the predetermined time after receiving the indication is equal to a duration of two transmission slots.

30. The method of claim 8, wherein the first channel is first a packet data channel, and step (c) further comprises determining that the transition signal packet contains information indicating that a packet on the first packet data channel that is concurrent with the transition signal packet is intended for the MS; and further comprising: determining data content of the concurrent packet on the packet data channel, which was received during the control hold state.

* * * * *

UNITED STATES PATENT AND TRADEMARK OFFICE
CERTIFICATE OF CORRECTION

| | | |
|---|---|---|
| PATENT NO. | : 7,203,527 B2 | Page 1 of 1 |
| APPLICATION NO. | : 10/431646 | |
| DATED | : April 10, 2007 | |
| INVENTOR(S) | : Czaja et al. | |

It is certified that error appears in the above-identified patent and that said Letters Patent is hereby corrected as shown below:

On The Title Page, Item (60) after the Related U.S. Application Data, please make the following correction:

"Provisional application No. 60/278,919" should read --Provisional application No. 60/378,919--.

Column 17, Claim 8, lines 9-10, --"number of transmission slot durations"-- should not be quoted.

Signed and Sealed this

Nineteenth Day of June, 2007

JON W. DUDAS
*Director of the United States Patent and Trademark Office*